(12) United States Patent
Nielsen et al.

(10) Patent No.: US 6,820,172 B2
(45) Date of Patent: Nov. 16, 2004

(54) METHOD, SYSTEM, AND PROGRAM FOR PROCESSING INPUT/OUTPUT (I/O) REQUESTS TO A STORAGE SPACE HAVING A PLURALITY OF STORAGE DEVICES

(75) Inventors: Karl Allen Nielsen, Tucson, AZ (US); Michael P. Vageline, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 10/108,156

(22) Filed: Mar. 25, 2002

(65) Prior Publication Data

US 2003/0182504 A1 Sep. 25, 2003

(51) Int. Cl.⁷ .............................................. G06F 12/00
(52) U.S. Cl. .............................. 711/114; 710/38; 714/6
(58) Field of Search ............................. 711/114; 714/6; 710/38

(56) References Cited

U.S. PATENT DOCUMENTS

| | | | |
|---|---|---|---|
| 5,051,887 A | | 9/1991 | Berger et al. |
| 5,664,219 A | | 9/1997 | Glassen et al. |
| 5,768,623 A | * | 6/1998 | Judd et al. ................. 710/37 |
| 5,848,241 A | | 12/1998 | Misinai et al. |
| 5,931,958 A | | 8/1999 | Bouvier et al. |
| 6,006,342 A | * | 12/1999 | Beardsley et al. .......... 714/5 |
| 6,061,274 A | | 5/2000 | Thibault et al. |
| 6,061,750 A | * | 5/2000 | Beardsley et al. .......... 710/74 |
| 6,138,187 A | | 10/2000 | Denning et al. |
| 6,145,028 A | * | 11/2000 | Shank et al. ............... 710/31 |
| 6,151,659 A | * | 11/2000 | Solomon et al. ............ 711/114 |
| 6,195,730 B1 | | 2/2001 | West |
| 6,282,610 B1 | * | 8/2001 | Bergsten ..................... 711/114 |
| 6,401,170 B1 | * | 6/2002 | Griffith et al. .............. 711/114 |
| 6,438,595 B1 | * | 8/2002 | Blumenau et al. ......... 709/226 |
| 6,513,097 B1 | * | 1/2003 | Beardsley et al. .......... 711/113 |
| 6,542,944 B2 | * | 4/2003 | D'Errico ..................... 710/38 |
| 6,574,667 B1 | * | 6/2003 | Blumenau et al. ......... 709/229 |
| 2002/0035666 A1 | * | 3/2002 | Beardsley et al. .......... 711/114 |
| 2003/0023781 A1 | * | 1/2003 | Benhase et al. ............ 710/22 |
| 2003/0070041 A1 | * | 4/2003 | Beardsley et al. .......... 711/113 |
| 2003/0101369 A1 | * | 5/2003 | Kahler et al. ............... 714/5 |
| 2003/0101371 A1 | * | 5/2003 | Fairhurst et al. ........... 714/9 |

OTHER PUBLICATIONS

IBM Corp., "Simultaneous Dual Link Transfer from Single Host to Single Target using Serial Storage Architecture (SSA)", Research Disclosure No. 436, Article No. 436139, Aug. 2000, p. 1457.

* cited by examiner

*Primary Examiner*—Hiep T. Nguyen
(74) *Attorney, Agent, or Firm*—David W. Victor; Konrad Raynes & Victor LLP (57) ABSTRACT

Provided are a method, system, and program for processing Input/Output (I/O) requests to a storage space having a plurality of storage devices. An Input/Output (I/O) request is received directed to a target location in a target storage device in the storage space, wherein the storage space includes at least two adaptors providing access to the storage devices. A determination is made of a plurality of paths to the target storage device, wherein a path comprises one adaptor or one adaptor and at least one intervening storage device. A determination is made of a characteristic of each determined path. One path is selected based on the determined characteristic and the I/O request is transmitted to the adaptor in the selected path.

46 Claims, 4 Drawing Sheets

METHOD, SYSTEM, AND PROGRAM FOR PROCESSING INPUT/OUTPUT (I/O) REQUESTS TO A STORAGE SPACE HAVING A PLURALITY OF STORAGE DEVICES

BACKGROUND OF THE INVENTION

1. Field of the Invention

The present invention relates to a system, method, and program for processing Input/Output (I/O) requests to a storage space having a plurality of storage devices.

2. Description of the Related Art

In a storage loop architecture, such as the Serial Storage Architecture (SSA), a plurality of disks are interconnected to one or more adaptors so that either of the adaptors can access the one or more loops of interconnected disks. An adaptor may include two or more ports to allow connection to one or more loops. For each loop on which the adaptor communicates, one adaptor port connects to a first disk in the loop and the other port connects to another disk in the loop. Additional adaptors may be added to the loop, such that one port on each other adaptor connects to one disk and another port connects to another disk so that the additional adaptors are placed within the loop. One or more computer systems, such as storage subsystems, host system, etc., may include the adaptors connecting to the loop. Additional details of the SSA architecture and different possible loop topologies are described in the International Business Machines Corporation (IBM) publication "Understanding SSA Subsystems in Your Environment", IBM document no. SG24-5750-00 (April, 2000).

In prior art SSA configurations, host systems will typically go through one of the available adaptors to access the disks or devices in the SSA loop. The disks in an SSA loop including two host adaptors may be configured with one or more Redundant Array of Independent Disks (RAID) ranks. In RAID systems, data is written in a stripe unit across a disk, where the blocks in a stripe are distributed across the multiple disks assigned to the RAID rank. In current SSA configurations, one host adaptor handles data access requests to a RAID rank, such that the one host adaptor will read and write data to all the disks in a stripe unit.

There is a continued need in the art to improve data access performance in device configurations, such as disks organized in a loop architecture.

SUMMARY OF THE PREFERRED EMBODIMENTS

Provided are a method, system, and program for processing Input/Output (I/O) requests to a storage space having a plurality of storage devices. An I/O request is received directed to target locations in a plurality of the storage devices, wherein the storage space includes at least two adaptors and wherein each adaptor is capable of separately executing an I/O request against at least one of the storage devices. Component I/O requests are generated to the target location in each of the storage devices. The component I/O requests for the different storage devices are transmitted to a plurality of adaptors, wherein each adaptor separately executes the component I/O request against one storage device to access the target location.

Further, the adaptors may concurrently execute the component I/O requests against the storage devices.

In certain implementations, the storage devices including the locations subject to the I/O request are configured within a Redundant Array of Independent Disks (RAID) rank. The target locations form a stripe unit in the RAID rank.

In still further implementations, the adaptors and storage devices are arranged in a loop architecture.

Further provided are a method, system, and program for processing Input/Output (I/O) requests to a storage space having a plurality of storage devices. An Input/Output (I/O) request is received directed to a target location in a target storage device in the storage space, wherein the storage space includes at least two adaptors providing access to the storage devices. A determination is made of a plurality of paths to the target storage device, wherein a path comprises one adaptor or one adaptor and at least one intervening storage device. A determination is made of a characteristic of each determined path. One path is selected based on the determined characteristic and the I/O request is transmitted to the adaptor in the selected path.

In further implementations, determining the characteristic comprises estimating performance of the path.

In still further implementations, estimating the performance comprises determining a number of intervening storage devices in the path between the adaptor and the target storage device. Further, estimating the performance may also include determining a number of I/O operations being processed by the adaptor in the path.

The described implementations provide techniques for selecting a path to reach a target storage device subject to an I/O request when the storage device may be accessed through separate adaptors. In certain implementations, multiple adaptors are used to concurrently access storage devices subject to a single I/O request. Still further, the implementations may be used to select one of multiple paths to a target storage device based on characteristics of the path, such as the performance of the path.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
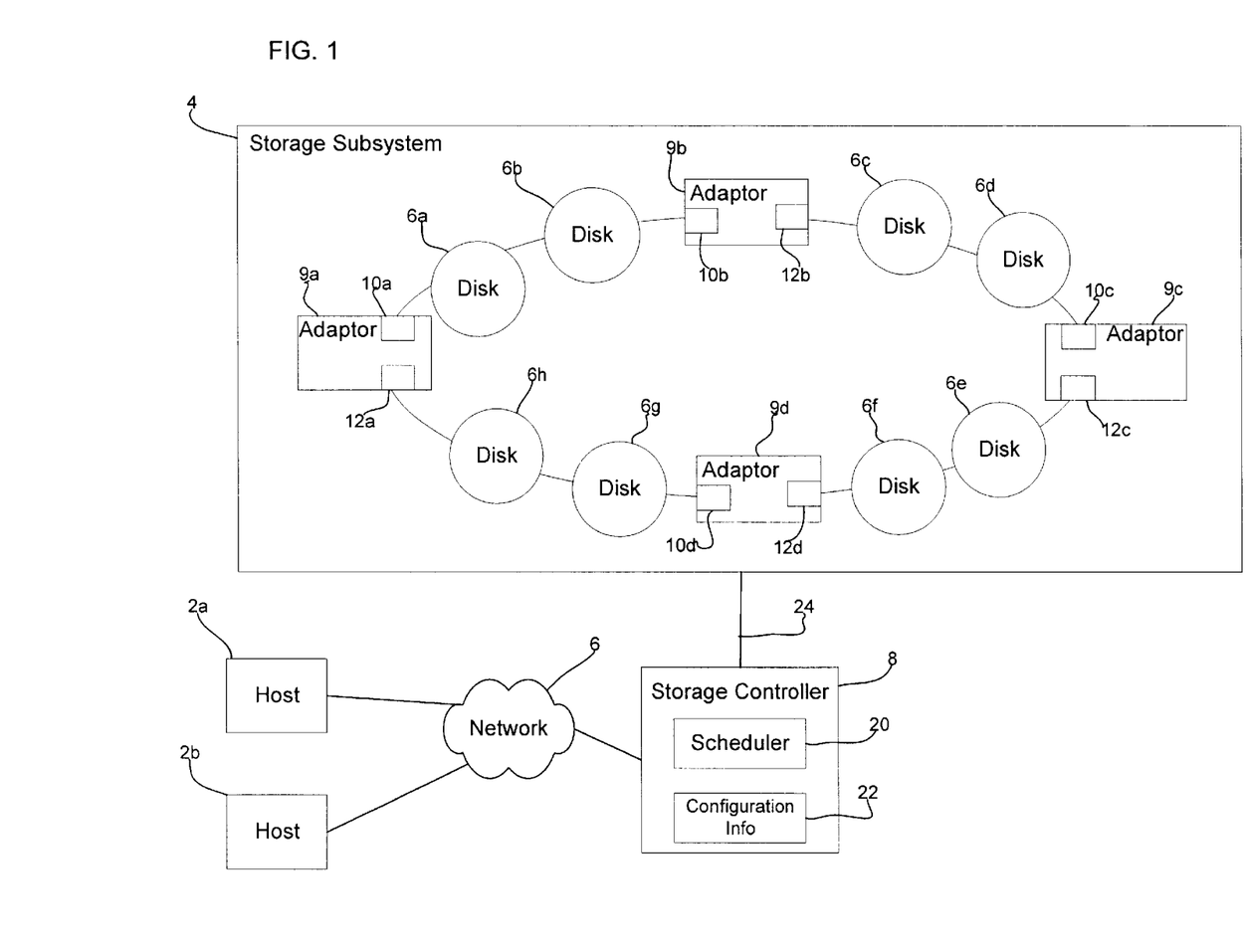
FIGS. 1 and 3 illustrate a storage architecture in which aspects of the invention are implemented.

FIG. 1 illustrates a computing environment in which aspects of the invention are implemented. Host systems 2a and 2b communicate Input/Output (I/O) requests directed to target locations in a storage subsystem 4 through a network 6 and storage controller 8. The host systems 2a, 2b may comprise any computer device known in the art, such as a server, mainframe, desktop system, workstation, laptop computer, hand held computer, telephony device, etc. The network 6 may comprise any network architecture known in the art, such as a Storage Area Network (SAN) using the Fibre Channel protocol, a Wide Area Network (WAN), a Local Area Network (LAN), the Internet, etc. The storage controller 8 may comprise any device known in the art that is capable of managing access to a storage system, such as the International Business Machines Corporation (IBM) Enterprise Storage Server (ESS)** or any other storage controller or server type device known in the art.

In the described implementations, the storage subsystem 4 includes a plurality of disks 6a, 6b . . . 6h, such as hard disk drives, tape drives, etc, that form a loop architecture. Dispersed between the devices 6a, 6b . . . 6h are adaptors 9a, 9b, 9c, 9d. The adaptors 9a, 9b, 9c, 9d may comprise cards within the slot of one or more computer systems, e.g., two adaptor cards may be in one system and another two in another system. The adaptors 9a, 9b, 9c, and 9d may comprise any type of disk controller known in the art. In FIG. 1, each of the adaptors 9a, 9b, 9c, 9d includes at least two ports 10a, 12a, 10b, 12b, 10c, 12c, 10d, 12d. The adaptors may include more than two ports, such as four ports. In the architecture of FIG. 1, each of the disks 6a, 6b . . . 6h connect to one port on one of the adaptors 9a, 9b, 9c, 9d. In alternative implementations, there may be several disks between two adaptors, such that certain disks are not connected directly to one adaptor. The disks 6a, 6b . . . 6h in the subsystem 4 may be configured into one or more RAID ranks.

The storage controller 8 includes a scheduler program 20 that manages the flow of I/O operations from the hosts 2a, b to the storage subsystem 4. The scheduler program 20 includes logic described below to route I/O requests to one of the adaptors 9a, 9b, 9c, 9d in the storage subsystem 4. The storage controller 8 maintains storage configuration data 22, which includes information describing the configuration and arrangement of devices, including the disks 6a, 6b . . . 6h and adaptors 9a, 9b, 9c, 9d in the disk subsystem 4. The scheduler 20 uses the information in the configuration file 22 to determine how to route I/O requests to the adaptors 9a, 9b, 9c, 9d. Further, if the target data of an I/O operation is dispersed among multiple disks 6a, 6b . . . 6h, then the scheduler 20 may break an I/O up into component I/O requests for each disk including a section of the data subject to the I/O request. The scheduler 20 would then simultaneously transmit the component I/O requests to adaptors 9a, 9b, 9c, 9d connected to the disks 6a, 6b . . . 6h including the requested data so that the adaptors 9a, 9b, 9c, 9d may execute the component I/O requests in parallel. In this way, the I/O request is concurrently executed by multiple processors. This arrangement increases the throughput by a factor of the number of adaptors 9a, 9b, 9c, 9d that concurrently execute the component I/O requests. For instance, if all of the disks 6a, 6b . . . 6h shown in FIG. 1 are configured as a RAID rank where a stripe unit is written across all the disks 6a, 6b . . . 6h, then the scheduler 20 may route component I/O requests to each adaptor 9a, 9b, 9c, 9d to concurrently execute the component I/O requests against all disks that include sections of the target stripe. Thus, in the example of FIG. 1, when the stripe unit is written across all of the disks 6a, 6b . . . 6h, each of the adaptors 9a, 9b, 9c, 9d may concurrently perform the read or write operation with respect to the connected disks, thereby increasing the throughput by a factor of four.

In further implementations, the scheduler 20 may select a path to perform an I/O operation that maximizes performance. A path comprises the intervening nodes, including adaptors 9a, 9b, 9c, 9d and disks 6a, 6b . . . 6h, through which the data must pass to reach the target disk. In the implementation of FIG. 1, each disk can be accessed directly by one adaptor, such that there is a path to each disk that has only an adaptor node. However, if the path having the minimum number of nodes, i.e., the path using the adaptor that directly connects to the target disk, is not optimal (e.g., the adaptor has errors or is busy), then another path having more intervening nodes may be selected, such as a path where the data must flow through one adaptor and one or more intervening disks before reaching the target disk. For instance, in architectures where there are several disks between any two adaptors, the data must flow through multiple nodes before reaching the target disk. Further, in certain of the described implementations, there are at least two paths to each disk because each disk can be reached from any one of the two of the adaptors that the disk is in between. In certain implementations, the scheduler 20 can route a request to any of the adaptors 9a, 9b, 9c, 9d in the storage subsystem 4.

In selecting the optimal path to any one target disk 6a, 6b . . . 6h, the scheduler 20 must consider the number of nodes to reach the target disk, also referred to as hops. Each additional hop may degrade performance, in certain cases by as much as 20%. Further, the scheduler 20 must also consider the current load and throughput at each adaptor 9a, 9b, 9c, 9d. Because each I/O request handled by an adaptor shares the adaptor bandwidth with other I/O requests concurrently being processed by the adaptor 9a, 9b, 9c, 9d, the bandwidth of any adaptor is determined by the number of requests currently being processed by the adaptor 9a, 9b, 9c, 9d. Further, because path throughput is a function of the node with the lowest bandwidth, if a path includes one or more disks as well as the adaptor, then the bandwidth would comprise the available bandwidth at the adaptor 9a, 9b, 9c, 9d reduced by a factor corresponding to the number of hops or intervening disks 6a, 6b . . . 6h in the path from the adaptor to the target disk. In certain implementations, the scheduler 20 may consider only one of the above factors (hops or throughput), consider both factors together, or consider the factors along with other factors to rank the performance of each path to a target device. For instance, the scheduler 20 can determine whether certain disks are experiencing errors which could further degrade bandwidth.

Figure 2:
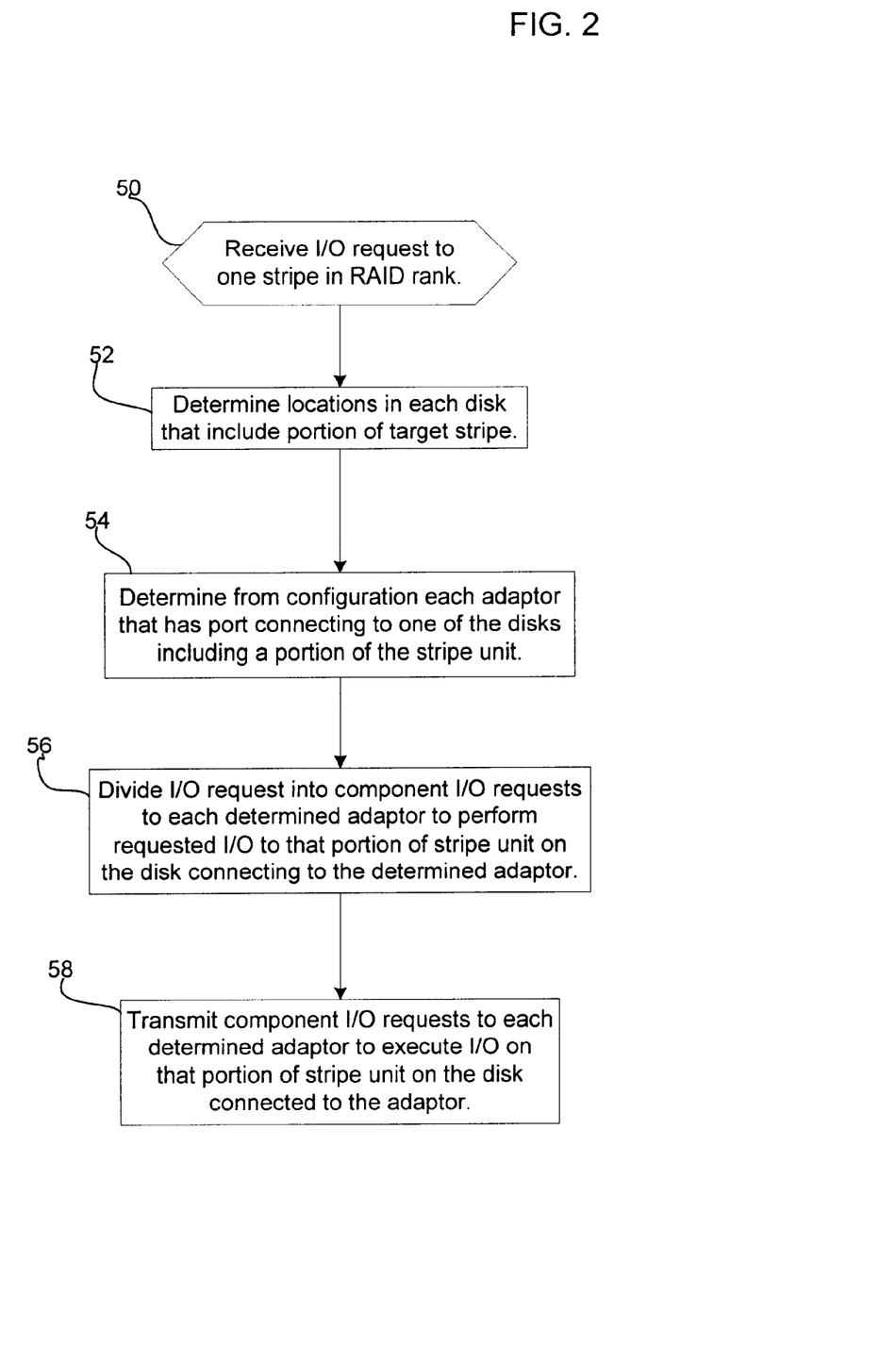
FIGS. 2 and 4 illustrate logic to access the storage devices to execute I/O requests in accordance with implementations of the invention.

FIG. 2 illustrates logic implemented in the scheduler program 20 to process an I/O request to a RAID stripe when certain of the disks 6a, 6b . . . 6h are configured in a RAID rank configuration, such that a stripe unit spans a plurality of the disks 6a, 6b . . . 6h. Control begins at block 50 when the storage controller 8 receives an I/O request, i.e., read or write request, directed to one stripe in a RAID rank configured in the storage subsystem 4. In response, the scheduler 20 determines (at block 52) from the configuration 22 the location in each disk 6a, 6b . . . 6h including a section of the target stripe in the RAID rank. From the configuration 22, the scheduler 20 further determines (at block 54) each adaptor 9a, 9b, 9c, 9d that has a port 10a, 10b, 10c, 10d, 12a, 12b, 12c, 12d connecting to one of the determined disks 6a, 6b . . . 6h. As mentioned, in the implementation of FIG. 1, each disk 6a, 6b . . . 6h directly connects to one adaptor port. The scheduler 20 then divides (at block 56) the I/O request into component I/O requests for each determined adaptor 9a, 9b, 9c, 9d to perform the requested I/O request with respect to that portion of the stripe unit on the disk 6a, 6b . . . 6h directly connected to a port on the adaptor. The scheduler 20 then transmits (at block 58) the component I/O requests to the adaptors 9a, 9b, 9c, 9d so that the sections of the target stripe unit on the disks are concurrently accessed by the different adaptors, separately executing the component I/O requests. This process improves throughput by a factor equivalent to the number of adaptors because the different sections of the stripe unit on the different disks are being simultaneously accessed.

In the implementation of FIG. 1, one or more RAID ranks may be configured on the disks in the loop. Further, less than all of the disks may be configured in a RAID rank. If one of the adaptors is busy, then the scheduler 20 may delay sending the component I/O request to the adaptor until the adaptor is available. Still further, if one of the adaptors is unavailable, i.e., off-line, or busy then the scheduler 20 may route the component I/O request to another available adaptor that connects to the disk 6a, 6b . . . 6h, although the request may have to proceed through intervening nodes to complete. In additional implementations, there may be any number of disks between any two of the adaptors. In such case, to access disks that are not directly connected to adaptors, the access request would have to pass through intervening disk nodes to reach the target disk.

Figure 3:
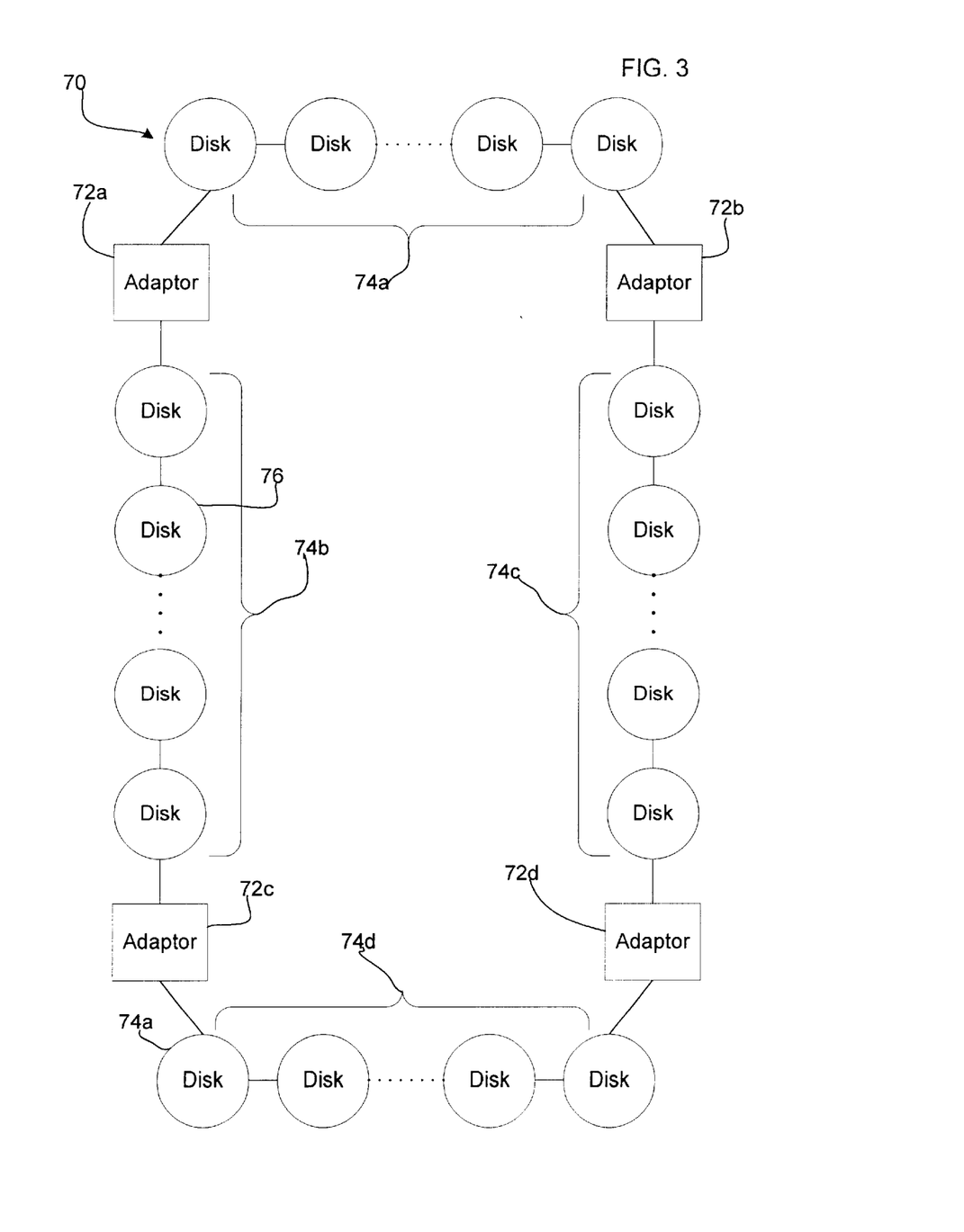

FIG. 3 illustrates an implementation where there are numerous groups of disks 74a, 74b, 74c, 74d between any two of the adaptors 72a, 72b, 72c, 72d in the loop 70. Further, there may be more than four adaptors in the loop, with any number of disks therebetween. Yet further, in cases where there are fewer adaptors than the number of disks in a stripe unit, then as many adaptors as possible may be used to concurrently access sections of the stripe at one time, and then as further adaptors become available, those adaptors may then be deployed to perform I/O for other sections of the stripe on disks not yet accessed.

Figure 4:
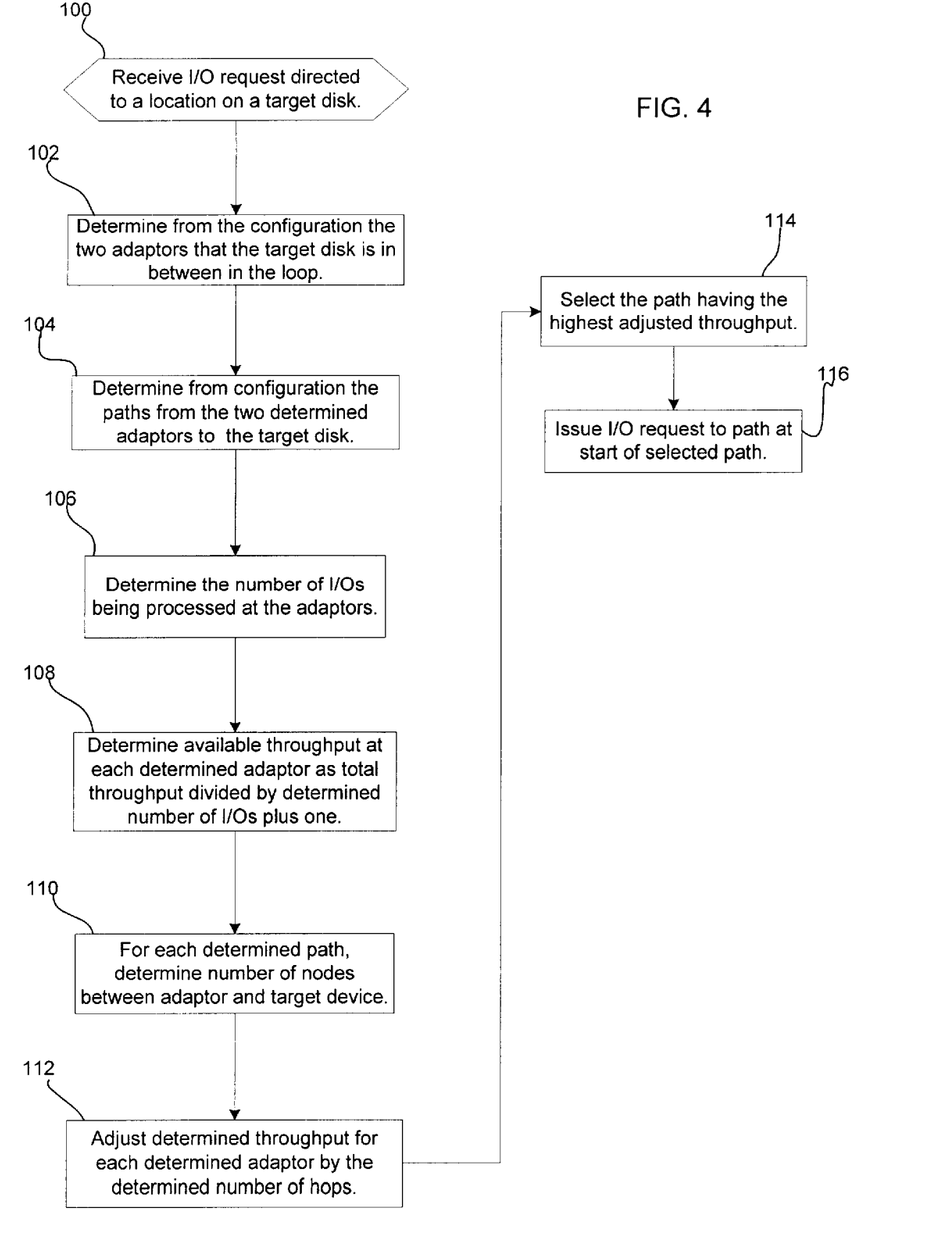

FIG. 4 illustrates additional logic implemented in the scheduler 20 to select a path to reach a target disk in any loop architecture, such as the architectures shown in FIGS. 1 and 3. Control begins at block 100 where the storage controller 8 receives from one host 2a, 2b an I/O request directed toward an address in one disk. The I/O request may be directed toward a RAID stripe, such that the requested data is striped across multiple disks. In such case, the scheduler 20 may determine component I/O requests for each disk including a section of the target stripe that is subject to the I/O request. The scheduler 20 determines (at block 102) from the configuration data 22 indicating the architecture of the disk subsystem the two adaptors closest to the target disk, i.e., the adaptors immediately on both sides of the target disk. The scheduler 20 then determines (at block 104) the paths from the determined adaptors to the target disk. For instance, if the target disk is disk 76 (FIG. 3), then the paths to the disk 76 would include the adaptors 72a and 72c, and all other intervening nodes, e.g., disks, between the adaptors 72a, 72c and the target disk 76.

The scheduler 20 then determines (at block 106) the number of I/O requests currently being processed at the determined adaptors 72a and 72c. This determination may be made by accessing a table providing such information or by querying the adaptors for such information. The adaptors may maintain a queue of I/O requests being processed. The available throughput at each determined adaptor 72a, 72c is then determined (at block 108) as a function of the number of requests currently being processed by that adaptor 72a, 72c. In certain implementations, the throughput at an adaptor may be calculated by dividing the total throughput of the adaptor by the number of current requests being processed plus one for the new request. Other equations and methods may be used to estimate the throughput for that adaptor for a new I/O request. The scheduler 20 further determines (at block 110) the number of intervening nodes between the adaptor 72a, 72c at the start of the path being considered and the target disk. The scheduler 20 then adjusts (at block 112) the determined throughput, which may be determined as a function of the number of I/O requests currently being processed by the adaptor 72a, 72c by a factor related to the number of determined nodes in the path. For instance, if a node or hop reduces the performance by twenty percent, then the throughput determined at block 108 would be reduced by the performance reduction per node times the number of nodes. The scheduler 20 then selects (at block 114) the one of the two paths having the highest adjusted throughput to use to reach the target disk. The I/O request is then issued (at block 116) to the adaptor 72a, 72c at the start of the determined path having the highest adjusted throughput.

With the logic of FIGS. 2 and 4, multiple adaptors may be used to access any one of the disks in the loop. By dynamically selecting adaptors to use to access a disk, the scheduler 20 may select the adaptor providing the highest throughput path to access a disk, thereby improving I/O performance. Moreover, if the requested data is striped across multiple disks, such as the case with a RAID arrangement, then the data for the stripe may be concurrently accessed from different disks by different adaptors, thereby increasing throughput by a factor of the number of adaptors concurrently accessing disks including sections of the target stripe.

Additional Implementation Details

The I/O request management operations described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the scheduler logic was implemented in a storage controller. Alternatively, the scheduler logic may be implemented in the adaptors in the disk subsystem or some other device.

In the described implementations, the storage devices and adaptors are all connected on a loop topology, using a loop protocol such as SSA, the Fibre Channel arbitrated loop protocol, etc. In alternative implementations, the adaptors may be connected to the storage devices in a non-loop topology. In the topology shown in FIGS. 1 and 3, each adaptor may directly communicate with any of the storage devices 6a, 6b . . . 6h. In additional implementations, one adaptor may have to communicate through another adaptor to reach a target storage device.

The storage controller 8 may connect 24 (FIG. 1) to the disk subsystem 4 and adaptors 9a, 9b, 9c, and 9d in many ways. For instance, if the adaptors 9a, 9b, 9c, 9d are installed in one or more host systems, then the storage controller 8 may have one or more separate connections to the host systems including the adaptors using any connection type known in the art, such as a Fibre Channel fabric, Ethernet, SCSI, etc. Further, the storage controller 8 may have separate connections directly to one or more of the adaptors 9a, 9b, 9c, 9d. Further, different types of connections may be combined. For instance, the storage controller 8 may use one connection type, e.g. Ethernet, to connect to one or more of the hosts and/or adaptors and another connection, e.g., Fibre Channel, to connect to other of the hosts and/or adaptors. Further, the storage controller 8 may have multiple connections to one host including adaptors or to one or more of the adaptors, where the multiple connections may be of the same type, e.g., Ethernet, Fibre Channel, SCSI, etc., or of different types. Still further, the storage controller 8 may have one or more paths connecting to a switch or hub that provides paths to the adaptors 9a, 9b, 9c, 9d or any device including the adaptors. In this way, the storage controller may use any combination of paths to access the adaptors directly or indirectly through another component such as a host.

In the described implementations, when multiple adaptors receive component I/O requests for different disk drives, the adaptors would concurrently execute the component I/O requests against the disk drives. Alternatively, the adaptors receiving the component I/O requests may not execute the requests concurrently.

In certain implementations, the disk drives 6a, 6b . . . 6h comprised magnetic hard disk drives. In alternative implementations, the storage devices connected in the loop with adaptors may comprise any storage device known in the art, such as optical disks, tapes, etc.

In the implementations shown in FIGS. 1 and 3, all the storage devices are arranged in a single loop. Additionally, the storage devices and adaptors may exist in multiple loops.

The logic of FIGS. 2 and 4 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing Input/Output (I/O) requests to a storage space having a plurality of storage devices, comprising:

receiving an Input/Output (I/O) request directed to target locations in a plurality of the storage devices, wherein the storage space includes at least two adaptors and wherein each adaptor is capable of separately executing an I/O request against at least one of the storage devices;

generating component I/O requests to the target location in each of the storage devices; and transmitting the component I/O requests for different storage devices to a plurality of adaptors, wherein each adaptor separately executes the component I/O request against one storage device to access the target location.

2. The method of claim 1, wherein the adaptors concurrently execute the component I/O requests against the storage devices.

3. The method of claim 1, wherein each storage device including one target location subject to the I/O request is directly connected to one adaptor, wherein the adaptors concurrently execute all the component I/O requests of the I/O request against all the storage devices having the target locations.

4. The method of claim 1, wherein the storage devices including the locations subject to the I/O request are configured within a Redundant Array of Independent Disks (RAID) rank, and wherein the target locations form a stripe unit in the RAID rank.

5. The method of claim 1, wherein the adaptors and storage devices are arranged in a loop architecture.

6. The method of claim 5, wherein each adaptor has at least two ports and wherein each disk is directly connected to one adaptor port.

7. A method for processing Input/Output (I/O) requests to a storage space having a plurality of storage devices, comprising:

receiving an Input/Output (I/O) request directed to a target location in a target storage device in the storage space, wherein the storage space includes at least two adaptors providing access to the storage devices;

determining a plurality of paths to the target storage device, wherein a path comprises one adaptor or one adaptor and at least one intervening storage device;

determining a characteristic of each determined path by determining a number of intervening storage devices in the path between the adaptor and the target storage device;

selecting one path based on the determined characteristic; and transmitting the I/O request to the adaptor in the selected path.

8. The method of claim 7, wherein determining the characteristic comprises estimating performance of the path.

9. The method of claim 8, wherein estimating the performance comprises determining the number of intervening storage devices in the path between the adaptor and the target storage device.

10. The method of claim 8, wherein estimating the performance comprises determining a number of I/O operations being processed by the adaptor in the path.

11. The method of claim 10, wherein the estimated performance is a function of both the number of I/O operations being processed by the adaptor and the number of intervening storage devices in the path.

12. The method of claim 7, wherein the I/O request is one of a plurality of component I/O requests to target locations in different storage devices.

13. The method of claim 7, wherein there are at least three storage devices between two adaptors.

14. The method of claim 13, wherein the adaptors and storage device are arranged in a loop topology, wherein there are at least three adaptors, and wherein there are at least three storage devices between any two adaptors.

15. The method of claim 1, wherein the storage devices are members of the set of storage devices comprising hard disk drives, optical disk drives, and tape drives.

16. A system for processing Input/Output (I/O) requests to a storage space having a plurality of storage devices and at least two adaptors, wherein each adaptor is capable of separately executing an I/O request against at least one of the storage devices, comprising:

means for receiving an Input/Output (I/O) request directed to target locations in a plurality of the storage devices;

means for generating component I/O requests to the target location in each of the storage devices; and means for transmitting the component I/O requests for different storage devices to a plurality of adaptors, wherein each adaptor separately executes the component I/O request against one storage device to access the target location.

17. The method of claim 16, wherein the adaptors concurrently execute the component I/O requests against the storage device.

18. A system for processing Input/Output (I/O) requests to a storage space having a plurality of storage devices and at least two adaptors providing access to the storage devices, comprising:

means for receiving an Input/Output (I/O) request directed to a target location in a target storage device in the storage space;

means for determining a plurality of paths to the target storage device, wherein a path comprises one adaptor or one adaptor and at least one intervening storage device;

means for determining a characteristic of each determined path by determining a number of intervening storage devices in the path between the adaptor and the target storage device;

means for selecting one path based on the determined characteristic; and means for transmitting the I/O request to the adaptor in the selected path.

19. The system of claim 18, wherein the means for determining the characteristic estimates performance of the path.

20. The system of claim 19, wherein estimating the performance comprises determining the number of intervening storage devices in the path between the adaptor and the target storage device.

21. The system of claim 19, wherein estimating the performance comprises determining a number of I/O operations being processed by the adaptor in the path.

22. The system of claim 21, wherein the estimated performance is a function of both the number of I/O operations being processed by the adaptor and the number of intervening storage devices in the path.

23. A system for processing Input/Output (I/O) requests, comprising:

a plurality of storage devices;

at least two adaptors, wherein each adaptor is capable of separately executing an I/O request against at least one of the storage devices;

means for receiving an Input/Output (I/O) request directed to target locations in the storage devices;

means for generating component I/O requests to the target location in each of the storage devices; and means for transmitting the component I/O requests for different storage devices to a plurality of adaptors, wherein each adaptor separately executes the component I/O request against one storage device to access the target location.

24. The system of claim 23, wherein the adaptors concurrently execute the component I/O requests against the storage devices.

25. The system of claim 23, wherein each storage device including one target location subject to the I/O request is directly connected to one adaptor, wherein the adaptors concurrently execute all the component I/O requests of the I/O request against all the storage devices having the target locations.

26. The system of claim 23, wherein the storage devices including the locations subject to the I/O request are configured within a Redundant Array of Independent Disks (RAID) rank, and wherein the target locations form a stripe unit in the RAID rank.

27. The system of claim 23, wherein the adaptors and storage devices are arranged in a loop architecture.

28. The system of claim 27, wherein each adaptor has at least two ports and wherein each disk is directly connected to one adaptor port.

29. A system for processing Input/Output (I/O), comprising:

a plurality of storage devices;

at least two adaptors providing access to the storage devices;

means for receiving an Input/Output (I/O) request directed to a target location in a target storage device that is one of the plurality of storage devices;

means for determining a plurality of paths to the target storage device, wherein a path comprises one adaptor or one adaptor and at least one intervening storage device;

means for determining a characteristic of each determined path by determining a number of intervening storage devices in the path between the adaptor and the target storage device;

means for selecting one path based on the determined characteristic; and means for transmitting the I/O request to the adaptor in the selected path.

30. The system of claim 29, wherein the means for determining the characteristic estimates performance of the path.

31. The system of claim 30, wherein estimating the performance comprises determining the number of intervening storage devices in the path between the adaptor and the target storage device.

32. The system of claim 30, wherein estimating the performance comprises determining a number of I/O operations being processed by the adaptor in the path.

33. An article of manufacture for processing Input/Output (I/O) requests to a storage space having a plurality of storage devices, wherein the article of manufacture causes operations to be performed, the operations comprising:

receiving an Input/Output (I/O) request directed to target locations in a plurality of the storage devices, wherein the storage space includes at least two adaptors and wherein each adaptor is capable of separately executing an I/O request against at least one of the storage devices;

generating component I/O requests to the target location in each of the storage devices; and transmitting the component I/O requests for different storage devices to a plurality of adaptors, wherein each adaptor separately executes the component I/O request against one storage device to access the target location.

34. The article of manufacture of claim 33, wherein the adaptors concurrently execute the component I/O requests against the storage devices.

35. The article of manufacture of claim 33, wherein each storage device including one target location subject to the I/O request is directly connected to one adaptor, wherein the adaptors concurrently execute all the component I/O requests of the I/O request against all the storage devices having the target locations.

36. The article of manufacture of claim 33, wherein the storage devices including the locations subject to the I/O request are configured within a Redundant Array of Independent Disks (RAID) rank, and wherein the target locations form a stripe unit in the RAID rank.

37. The article of manufacture of claim 33, wherein the adaptors and storage devices are arranged in a loop architecture.

38. The article of manufacture of claim 37, wherein each adaptor has at least two ports and wherein each disk is directly connected to one adaptor port.

39. An article of manufacture for processing Input/Output (I/O) requests to a storage space having a plurality of storage devices, wherein the article of manufacture is capable of causing operations to be performed, the operations comprising:

receiving an Input/Output (I/O) request directed to a target location in a target storage device in the storage space, wherein the storage space includes at least two adaptors providing access to the storage devices;

determining a plurality of paths to the target storage device, wherein a path comprises one adaptor or one adaptor and at least one intervening storage device;

determining a characteristic of each determined path by determining a number of intervening storage devices in the path between the adaptor and the target storage device;

selecting one path based on the determined characteristic; and transmitting the I/O request to the adaptor in the selected path.

40. The article of manufacture of claim 39, wherein determining the characteristic comprises estimating performance of the path.

41. The article of manufacture of claim 40, wherein estimating the performance comprises determining the number of intervening storage devices in the path between the adaptor and the target storage device.

42. The article of manufacture of claim 40, wherein estimating the performance comprises determining a number of I/O operations being processed by the adaptor in the path.

43. The article of manufacture of claim 39, wherein the estimated performance is a function of both the number of I/O operations being processed by the adaptor and the number of storage devices in the path.

44. The article of manufacture of claim 39, wherein the I/O request is one of a plurality of component I/O requests to target locations in different storage devices.

45. The article of manufacture of claim 39, wherein there are at least three storage devices between two adaptors.

46. The article of manufacture of claim 45, wherein the adaptors and storage device are arranged in a loop topology, wherein there are at least three adaptors, and wherein there are at least three storage devices between any two adaptors.

* * * * *